United States Patent [19]

Iachetta, Jr.

[11] Patent Number: 5,727,171
[45] Date of Patent: Mar. 10, 1998

[54] METHOD AND APPARATUS FOR ALLOWING MULTI-SPEED SYNCHRONOUS COMMUNICATIONS BETWEEN A PROCESSOR AND BOTH SLOW AND FAST COMPUTING DEVICES

[75] Inventor: Richard Nicholas Iachetta, Jr., Pflugerville, Tex.

[73] Assignee: International Business Machines Corporation, Armonk, N.Y.

[21] Appl. No.: 558,511

[22] Filed: Nov. 16, 1995

[51] Int. Cl.⁶ .................................................. G06F 13/00
[52] U.S. Cl. .................. 395/287; 395/880; 395/881; 395/856; 395/556
[58] Field of Search .............................. 395/287, 551, 395/553, 556, 559, 880, 881, 856

[56] References Cited

U.S. PATENT DOCUMENTS

| | | | |
|---|---|---|---|
| 5,072,442 | 12/1991 | Todd | 370/62 |
| 5,191,657 | 3/1993 | Ludwig et al. | 395/325 |
| 5,247,636 | 9/1993 | Minnick et al. | 395/560 |
| 5,301,282 | 4/1994 | Amini et al. | 395/293 |
| 5,386,517 | 1/1995 | Sheth et al. | 395/275 |
| 5,392,404 | 2/1995 | Thompson | 395/860 |
| 5,404,462 | 4/1995 | Datwyler et al. | 395/325 |
| 5,416,910 | 5/1995 | Moyer et al. | 395/293 |

Primary Examiner—Jack B. Harvey
Assistant Examiner—Ario Etienne
Attorney, Agent, or Firm—Volel Emile; Andrew J. Dillon

[57] ABSTRACT

An improved data processing system includes a number of components which cooperate together. A synchronous data bus is provided for communicating data. A central processing unit is provided for executing program instructions. The central processing unit is communicatively connected to the synchronous data bus. At least one memory is provided for storing at least one of programming instructions and digital data. The memory is communicatively connected to the central processing unit. A data processing device is provided which is communicatively connected to the synchronous data bus. At least one data processing device includes at least one fast data processing device and at least one slow data processing device. The fast data processing device is capable of communicating data at a faster rate than the slow data processing device. In accordance with the present invention, the improved data processing system is operable in a plurality of modes of operations, including a fast mode of operation and a slow mode of operation. During the fast mode of operation, at least one fast data processing device communicates data over the synchronous data bus at a relatively high rate of speed, while the data bus arbiter restricts the slow data processing device from accessing the synchronous data bus.

17 Claims, 8 Drawing Sheets

METHOD AND APPARATUS FOR ALLOWING MULTI-SPEED SYNCHRONOUS COMMUNICATIONS BETWEEN A PROCESSOR AND BOTH SLOW AND FAST COMPUTING DEVICES

BACKGROUND OF THE INVENTION

1. Technical Field

The present invention relates in general to data processing systems, and in particular data processing systems with improved synchronous communication buses.

2. Description of the Related Art

The prior art solves the problem of not allowing two separate devices to communicate data at different clock speeds over a single synchronous bus in two different ways.

First, the prior art has joined two separate synchronous busses together by a translator device. Devices attached to the first synchronous bus can communicate data at a first speed, while devices attached to the second bus can communicate data at a second speed. Data is passed between the two busses by the translator device, thereby allowing devices residing on the first and second busses to communicate with one another.

The second solution used in the prior art requires that fast devices, which are capable of communicating data at higher speeds than slow devices, communicate data at a slow speed when connected to a synchronous bus containing slow devices. Thus, the rate at which data can be communicated is directly related to the clock rate at which the slowest device connected to the synchronous bus can communicate data.

SUMMARY OF THE INVENTION

It is one objective of the present invention to provide an improved data processing system which utilizes a single synchronous bus, but which allows for differing rates of data transmission over the single synchronous bus.

It is another objective of the present invention to provide an improved data processing system with an improved synchronous data bus which allows for a plurality of modes of operation, including a fast data processing mode of operation wherein data is transmitted over the synchronous bus at a relatively high rate of speed, and a slow data processing mode of operation, wherein data is communicated over the same synchronous bus at a relatively low rate.

These and other objectives are achieved as now described, the present invention may be characterized as an improved data processing system which includes a number of components which cooperate together. A synchronous data bus is provided for communicating data. A central processing unit is provided for executing program instructions. The central processing unit is communicatively connected to the synchronous data bus. At least one memory is provided for storing at least one of programming instructions and digital data. The memory is communicatively connected to the central processing unit. A data processing device is provided which is communicatively connected to the synchronous data bus. At least one data processing device includes at least one fast data processing device and at least one slow data processing device. The fast data processing device is capable of communicating data at a faster rate than the slow data processing device. In accordance with the present invention, the improved data processing system is operable in a plurality of modes of operations, including a fast mode of operation and a slow mode of operation. During the fast mode of operation, at least one fast data processing device communicates data over the synchronous data bus at a relatively high rate of speed, while at least one slow data processing device remains able to communicate data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
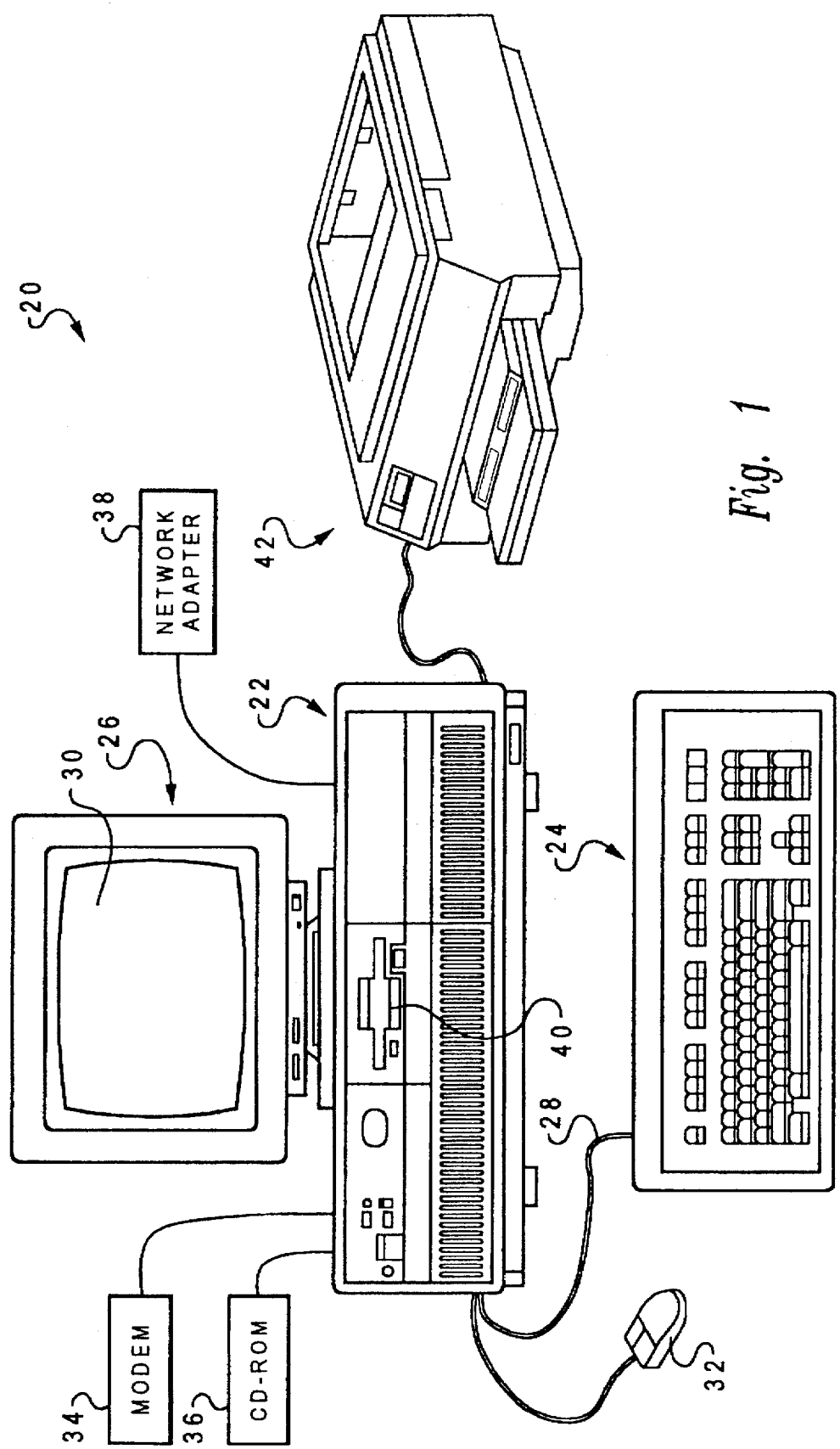
FIG. 1 depicts a data processing system capable of implementing the current invention.

With reference to the figures and in particular FIG. 1, there is depicted a data processing system 20, which includes processor 22, keyboard 24, and display 26. Keyboard 24 is coupled to processor 22 by cable 28. Display 26 includes a display screen 30 which may be implemented using a cathode ray tube (CRT), a liquid crystal display, electroluminescent panel or the like. Data processing 20 also includes pointing device 32, which may be implemented using a trackball, joystick, touch sensitive tablet or screen, trackpad, or as illustrated in FIG. 1, a mouse. Pointing device 32 may be utilized to move a pointer or cursor on display screen 30. Processor 22 may also be coupled to one or more peripheral devices such as a modem 34, CD-ROM 36, network adaptor 38, or floppy disk drive 40, each of which may be internal or external to the enclosure of processor 22. An output device such as printer 42 may also be coupled to processor 22. Those persons skilled in the art of data processing systems design should recognize that display 26, keyboard 24 and pointing device 32 may each be implemented using any one of several known off the shelf components. Data processing system 20 may be implemented utilizing any general purpose computer or so called personal computer, such as the personal computer sold under trademark "PS2" which is manufactured and distributed by International Business Machines Corporation (IBM), of Armonk, N.Y.

Figure 2:
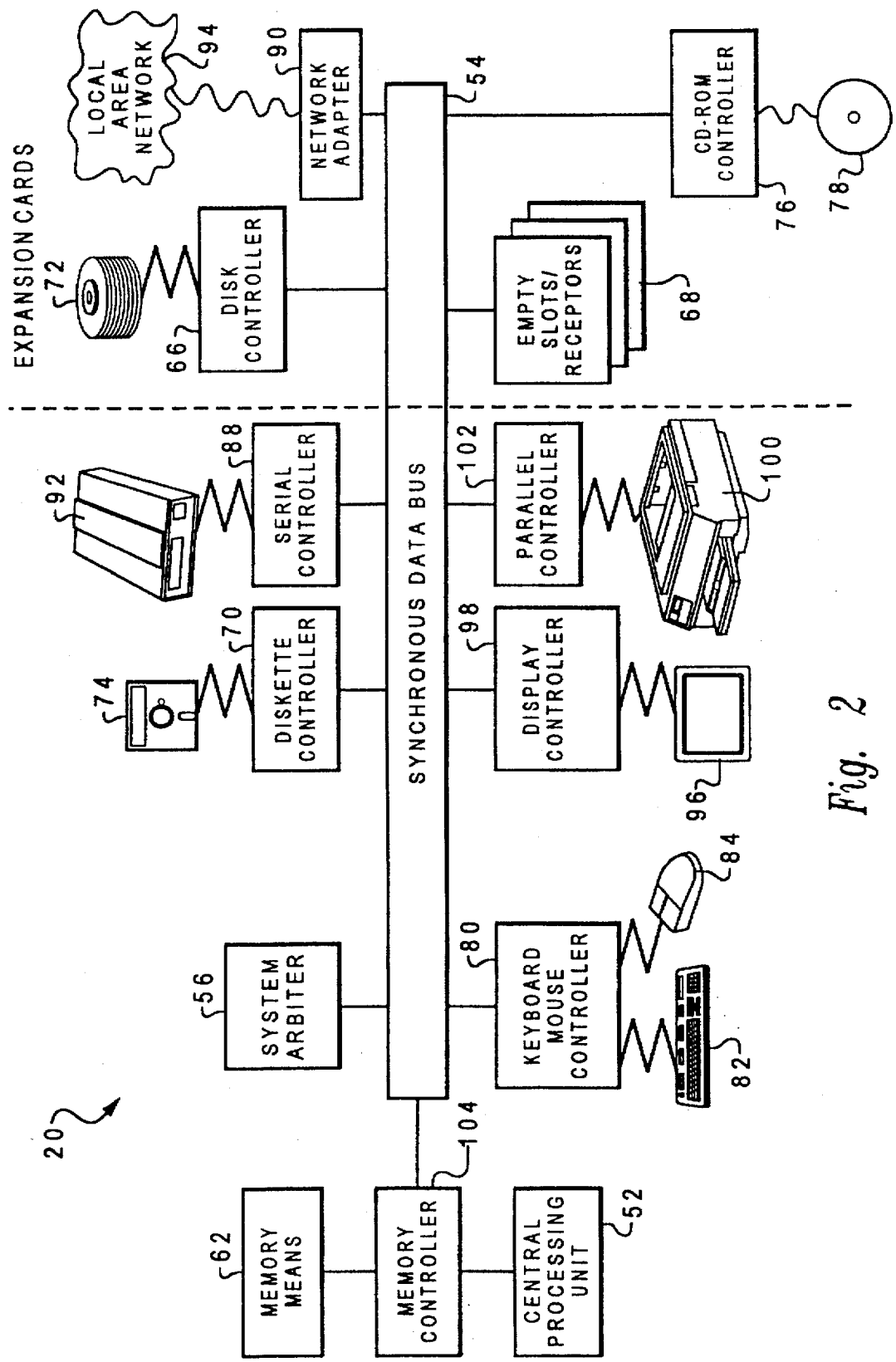
FIG. 2 is a more detailed high-level block diagram which further illustrates the major components of the data processing system of FIG. 1.

With reference now to FIG. 2 there is depicted a high level block diagram which further illustrates the major components that may be included in data processing system 20 of FIG. 1. Data processing system 20 is controlled primarily by computer readable instructions which may be in the form of software, wherever, or by whatever means such software is stored or accessed. Such software may be executed within central processing unit (CPU) 50 to cause data processing system 20 to do work. In many known workstations and personal computers such as the personal computer sold by IBM under the trademark "PS2", central processing unit 50 is implemented by single chip CPU called a microprocessor. Examples of such microprocessors include the microprocessor sold under the trademark "PENTIUM" by Intel Corporation and the microprocessor sold under the trademark "PowerPC" by International Business Machines Corporation. CPU 50 fetches, decodes and executes instructions and transfers information to and from other resources via the computers main data transfer path, synchronous data bus 54. Such a synchronous data bus connects the components in data processing system 20 and defines the medium for data exchange. Synchronous data bus 54 typically includes data lines for sending data, address lines for sending addresses, and control lines for sending interrupts and for operating synchronous data bus 54. However, in some implementations of a synchronous data bus, these address, data and control lines may not be separate entities, but may be multiplexed over the same physical connections. An example of such a synchronous data bus is the "Peripheral Component Interconnect" (PCI) synchronous data bus.

Data processing system 20 is provided with a memory means 62. Memory means 62 can include random access memory (RAM), read only memory (ROM) and nonvolatile memory. Such memories include circuitry that allows information to be stored and retrieved. ROMs contains stored data that cannot be modified. Data stored in RAM can be read or changed by CPU 50 or other hardware devices. Nonvolatile memory is memory that does lose data when power is removed from it. Nonvolatile memories include ROM, EPROM, flash memory, bubble memory or battery backed CMOS RAM.

Access to memory means 62 may be controlled by a memory controller 104. Memory controller 104 may provide an address translation function that translates virtual addresses into physical addresses as instructions are executed. Memory controller 104 may also provide a memory protection function that isolates processes within the system and isolates system processes from user processes. Thus, a thread running in user mode can access only memory mapped by its own process virtual address base; it cannot access memory within other processes virtual address base unless memory sharing between the processes has been set up. Often times, however, these functions are performed by CPU 50. Memory controller 104 may also act to regulate access to memory from CPU 50 and other elements residing on synchronous data bus 54. In some implementations, memory controller 104 is referred to as a host bridge.

An expansion card or expansion board is a circuit board that includes chips and other electronic components connected in a circuit that adds functions or resources to data processing system 20. Typical expansion cards add memory, disk drive controller 66, video support, parallel and serial ports, and internal modems. These expansion cards are typically inserted into receptors that are capable of receiving them. These receptors are often times referred to as expansion slots. These receptors or expansion slots provide a means for connecting the expansion card to the synchronous data bus. For laptop, palmtop and other portable computers, expansion cards usually take the form of PCMCIA (Personal Computer Memory Card International Association) cards which are credit card sized devices designed to plug into a slot in the side or back of a computer. An example of such a slot is the PCMCIA slot which defines type I, II and III card slots. Thus, empty slots/receptors 68 may by used to receive various types of expansion cards or PCMCIA cards.

Disk controller 66 and diskette controller 70 both include special purpose integrated circuits and associated circuitry that directs and controls reading from and writing to hard disk drive 72 and floppy disk 74 respectively. Such disk controllers handle task such as positioning the read/write head, mediating between the drive and microprocessor, and controlling the transfer of information to and from memory. A single disk controller may be able to control more than one disk drive.

CD-ROM controller 76 may be included in data processing system 20 for reading data from CD-ROM 78 (compact disk read only memory). Such CD-ROMs use laser optics rather than magnetic means for reading data. Keyboard/mouse controller 80 is provided in a data processing system 20 for interfacing with keyboard 82 and a pointing device such as a mouse 84. Such pointing devices are typically utilized to control an on screen element such as a cursor which may take the form of an arrow having a hot spot that specifies the location of the pointer when the user presses a mouse button. Other pointing devices include the graphics tablet, the stylus, the light pen, the joystick, the puck, the trackball, the trackpad and the pointing sold under the name "Trackpoint" by IBM.

Communication between data processing system 20 and other data processing systems may be facilitated by serial controller 88 and network adaptor 90, both of which are coupled to synchronous data bus 54. Serial controller 88 is utilized to transmit data between computers or between a computer and peripheral device one bit at a time over a single line. Serial communications can be synchronous (controlled by some time standard, such as a clock) or asynchronous (managed by the exchange of control signals that govern the flow of information). Examples of serial communication standards include the RS-232 interface and the RS-422 interface.

As illustrated in FIG. 2, such a serial interface may be utilized to communicate with modem 92. A modem is a communications device that enables a computer to transmit information over a standard telephone line. Modems can convert digital computer signals to analog signal suitable for communication over telephone lines. Modem 92 may be utilized to connect data processing system 20 to an on line information service such as the information service provided under the service mark "Prodigy" by IBM and Sears. Such on line service providers may offer software which may be downloaded into data processing system 20 via modem 92. Modem 92 may provide a connection to other sources of software such as a server, an electronic bulletin board, and the Internet or World Wide Web.

Network adaptor 90 may be used to connect data processing system 20 to a local area network 94. Network 94 may provide computer users with means of communicating and transferring software and information electronically. Additionally, network 94 may provide distributive processing which involves several computers and the sharing of workloads or cooperative efforts in performing tasks.

Display 96, which is controlled by display controller 98, is used to display visual output generated by data processing system 20. Such visual output may include text, graphics, animated graphics, and video. Display 96 may be implemented with a CRT base video display, a LCD based flat panel display or a gas plasma based flat panel display. Display controller 98 includes electronic components required to generate a video signal when it is sent to display 96.

Printer 100 may be coupled to data processing system 20 via parallel controller 102. Printer 100 is used to put text or computer generated images on paper or on another medium, such as a transparency. Other types of printers may include an image setter, a plotter, or a film recorder. Parallel controller 102 is used to send multiple data and control bits simultaneously over wires connected between synchronous data bus 54 and another parallel communication device, such as a printer. The most common parallel interface is the Centronics interface.

Figure 3:
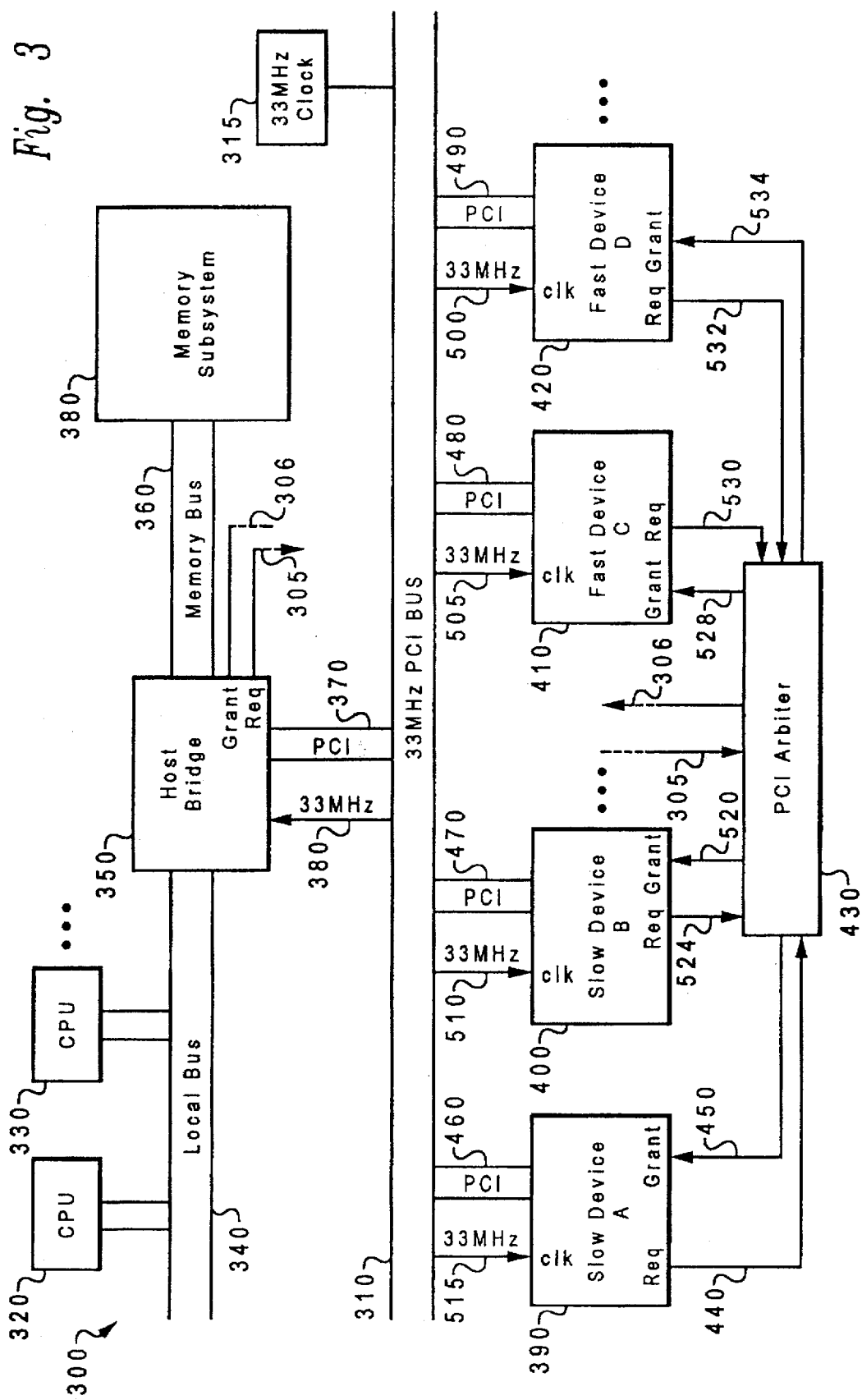
FIG. 3 illustrates an implementation of a data processing system containing a prior art PCI synchronous data bus.

Now with respect to FIG. 3, data processing system 300 shows a prior art implementation of a synchronous bus system. This particular implementation of a synchronous data bus is known as a PCI bus. This is a particular type of synchronous data bus and is governed by the PCI specification as set forth by the PCI Special Interest Group. The original PCI bus specification version 1.0 was developed by Intel Corporation. Now, however, the specification is managed by a consortium of industry partners known as the PCI Special Interest Group. The latest PCI specification available at this time is version 2.1. The mailing address for the PCI Special Interest Group is: P.O. Box 14070, Portland, Oreg. 97214.

Data processing system 300 is comprised of CPUs 320 and 330. Although this particular data processing system contains two CPUs it could as easily contain one CPU or could contain more than two CPUs as shown. CPU 320 and CPU 330 are connected to a local bus 340. Local bus 340 in turn is connected to host bridge 350.

Host bridge 350 manages the requests for access to memory subsystem 380. In other words, host bridge 350 serves as a central point for managing the various request coming from the CPUs and other devices for access to memory subsystem 380.

Memory subsystem 380 is connected to host bridge 350 by memory bus 360. Memory subsystem 380 can be comprised of any number of types of memory devices including RAM, ROM, EEPROM and other electronic storage forms.

Host bridge 350 is connected to PCI bus 310 by PCI connection 370. PCI connection 370 carries all of the address, data and control information that host bridge 350 needs to communicate over PCI bus 310.

Host bridge 350 is also connected to 33 MHz clock input 380. 33 MHz clock input 380 is necessary to allow host bridge 350 to perform synchronous data reads and data writes over PCI bus 310.

Attached to PCI bus 310 is Slow Device A 390. Slow Device A 390 is connected to PCI bus 310 by PCI connection 460. PCI connection 460 carries address, data and control information from PCI bus 310 to slow device A 390. Having PCI connection 460 allows Slow Device A 390 to communicate with host bridge 350 and other devices that are similarly connected to PCI bus 310. Slow device A 390 is also connected to 33 MHz clock source 515. This is the same clock signal as 33 MHz clock input 380 that is attached to the host bridge. 33 MHz clock input 515 allows Slow Device A 390 to communicate in a synchronous manner over PCI bus 310.

Although 33 MHz clock source 515 is shown as a single discrete unit, those skilled in the art will appreciate that having a single clock source is often impractical. Often times, due to loading concerns, several clock devices will be joined together into a clock signal generator system. These clock devices will be controlled by a Phase Locked Loop device, and will produce a uniform clock signal.

Slow device A 390 is also connected to REQUEST line 440 and GRANT line 450. These lines connect Slow Device A 390 to PCI arbiter 430. These connections allow PCI arbiter 430 to regulate which device has access to the PCI bus 310 at any one time.

Also connected to PCI bus 310 is Slow Device B 400. Slow Device B 400 is connected to PCI bus 310 in the same manner as Slow Device A 390. There is PCI connection 470 and 33 MHz clock input 510. Likewise, there is REQUEST line 524 and GRANT line 526 which connect Slow Device B 400 to PCI arbiter 430.

In addition to Slow Device A 390 and Slow Device B 400, connected to PCI bus 310 are Fast Device C 410 and Fast Device D 420. Both Fast Device C 410 and Fast Device D 420 have the same connections with respect to PCI bus 310 and PCI arbiter 430 as do Slow Device A 390 and Slow Device B 400. These connections include, for Fast Device C 410, PCI connection 480, 33 MHz clock input 505, REQUEST line 530 and GRANT line 528. Likewise, Fast Device D 420 has PCI connection 490, 33 MHz clock input 500, GRANT line 534 and REQUEST line 532.

As mentioned earlier, Slow Device A 390, Slow Device B 400, Fast Device C 410 and Fast Device D 420 all are connected to PCI arbiter 430 by their respective REQUEST and GRANT lines. Also connected to PCI arbiter 430 is host bridge 350. Host bridge 350 is connected to PCI arbiter 430 by REQUEST line 305 and GRANT line 306. Although in FIG. 3, PCI arbiter 430 is shown as a separate entity from host bridge 350, in some implementations of a PCI synchronous bus, both host bridge 350 and PCI arbiter 430 would be found in the same physical device. This device would often take the form of either one integrated circuit package or a set of integrated circuit packages. Such a package of chips would implement the PCI standard and would likely combine the functions of PCI arbiter 430 and host bridge 350.

PCI arbiter 430 serves is to regulate the various devices' and host bridge's request for access to PCI bus 310. PCI arbiter 430 prevents two devices from trying to communicate over PCI bus 310 at the same time. It accomplishes this task by using the various GRANT and REQUEST lines that are connected to it. A device wishing to have access to PCI bus 310 would first asset their REQUEST line. Upon seeing a certain device's REQUEST line asserted, PCI arbiter 430 would then take steps to assert the requesting device's GRANT line. When the requesting device sees that his GRANT line has been asserted, he will then, after a certain period of time as defined in the PCI specification, and upon certain conditions appearing upon the control lines, will have access to PCI bus 310.

Also connected to PCI bus 310 is 33 MHz clock source 315. As previously stated, all devices connected to PCI bus 310 as well as host bridge 350 have to have the same clock signal in order to be able to communicate in a synchronous manner over PCI bus 310, as this the nature of a synchronous data bus.

The data processing system shown in FIG. 3 contains both slow devices and fast devices. A slow device is one that is only capable of performing data transfer operations over a synchronous bus utilizing a slow clock rate wherein a slow clock rate in this example would be 33 MHz. FIG. 3 also shows two fast devices, Fast Device C 410 and Fast Device D 420. A fast device is a device capable of performing data communications over a synchronous bus at a clock rate that is faster than the slow clock rate mentioned above. In this example, this fast clock rate would be faster than 33 MHz.

How fast or slow a given device is capable of communicating data is not solely a function of the clock rate it is capable of using to synchronize its communications. Other factors such as the width of the address and data bus and the use of wait states will affect the ultimate data transfer rate of a device. Also, a slow device may be capable of utilizing a fast clock to perform its data communications with the help of wait states. However, the rate at which a given device can communicate data is ultimately governed by the fastest clock rate it can fully utilize to synchronize its data transfer with another device. In this specification, a fast device can utilize a faster clock signal to communicate data than a comparable slow device.

Prior art data processing systems, such as the one shown by data processing system 300, are referred to as prior art because of the problem presented in FIG. 3. Due to the single clock source, 33 MHz clock source 315, both Fast Device C 410 and Fast Device D 420 are unable to perform data communications over PCI bus 310 at any rate faster than 33 MHz. Thus, their ability to perform at a faster rate than Slow Device A 390 and Slow Device B 400 is wasted, since there is not a faster clock source with which they can synchronize their data transmissions.

Figure 4:
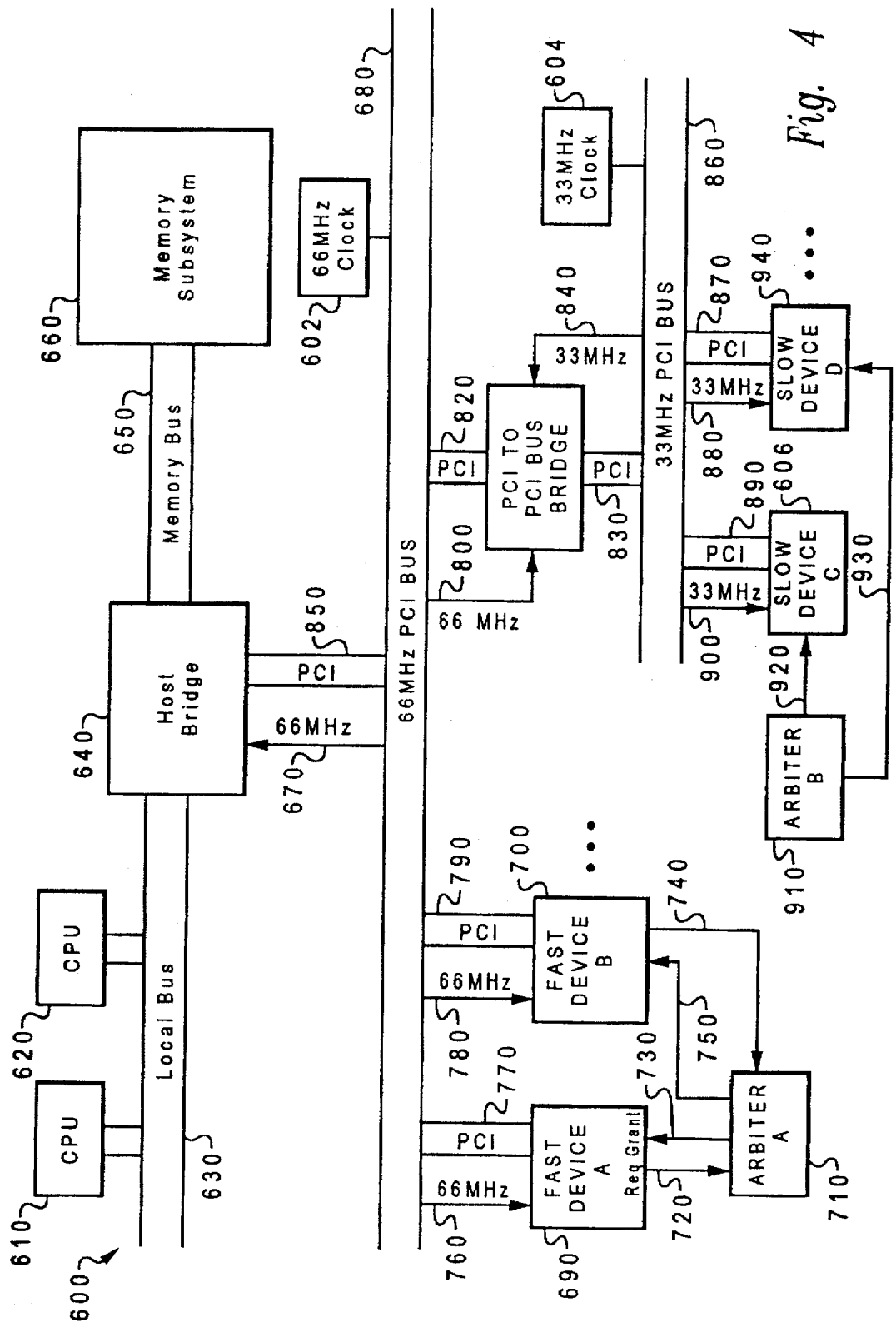
FIG. 4 shows an implementation of a data processing system containing two prior art PCI synchronous data buses that operate at different speeds, and are communicably joined.

Now with respect to FIG. 4, FIG. 4 illustrates another data processing system governed by PCI specification 2.1. This prior art implementation of a synchronous data bus overcomes the deficiency of not allowing fast and slow devices to coexist in the same data processing system, but this prior art implementation introduces new problems at the same time.

Data processing device 600 is comprised of CPU 610 and CPU 620. These CPUs are connected to local bus 630. Local bus 630 is connected to a host bridge 640. Host bridge 640 is connected to memory bus 650 which in turn is connected to memory subsystem 660.

Host bridge 640 is connected to PCI bus 680 by PCI connection 850. PCI connection 850 contains address, data and control lines that are necessary for host bridge 640 to communicate with other devices attached to PCI bus 680. Also connected to host bridge 640 is 66 MHz clock input 670.

Fast Device A 690 and Fast Device B 700 are also attached to PCI bus 680. Fast Device A 690 is attached to PCI bus 680 by PCI connection 770. Fast device B 700 is attached to PCI bus 680 by PCI connection 790. Both Fast Device A 690 and Fast Device B 700 receive 66 MHz clock inputs. Fast Device A receives 66 MHz clock input 760 while Fast Device B 700 receives 66 MHz clock input 780. Both of these clock signals originate at the same source, 66 MHz clock source 602.

Fast Device A 690 and Fast Device B 700 are connected to Arbiter A 710. Fast Device A 690 is connected to Arbiter A 710 by REQUEST line 720 and GRANT line 730. Likewise, Fast Device B 700 is connected to Arbiter A 710 by GRANT line 780 and REQUEST line 740.

In addition to PCI bus 680, there is PCI bus 860. In a manner much like Fast Device A 690 and Fast Device B 700, Slow Device C 606 and Slow Device D 940 are attached to PCI bus 860. Slow Device C is attached to PCI bus 860 by PCI connection 890, while Slow Device D 940 is attached to PCI bus 860 by PCI connection 870. Slow device C 606 is further connected to PCI bus 860 by 33 MHz clock input 900. Likewise, Slow Device D 940 is connected to 33 MHz clock input 880.

Both Slow Device C 606 and Slow Device D 940 are attached to Arbiter B 910. This is accomplished by connection 920 which embodies both the GRANT and REQUEST lines running from Slow Device C 606 to Arbiter B 910. Likewise, Slow Device D is connected to Arbiter B 910 by connection 930. Connection 930 contains both the GRANT line and the REQUEST line running from Arbiter B 910 to Slow Device D 940. 33 MHz clock input 880 and 33 MHz clock input 900 are both connected to 33 MHz clock source 604.

The main unique feature to data processing system 600 as opposed to data processing system 300, shown in FIG. 3, is the existence of PCI to PCI bus bridge 810. The purpose of PCI to PCI bus bridge 810 is to translate data coming from PCI bus 860 to PCI bus 680 and vice versa. PCI bus 860 communicates data at a rate governed by 33 MHz clock source 604 while PCI bus 680 communicates data at a rate governed by 66 MHz clock source 602. Since both of these synchronous buses are running at different clock rates, they are unable to converse with each other directly. That is, they cannot communicate data without going through some sort of a translator. PCI to PCI bus bridge 860 serves as this translator and is able to transfer data from PCI bus 680 to PCI bus 860 and vice versa.

PCI to PCI bus bridge 810 is able to accomplish this task because it is connected to the same resources as both PCI bus 860 and PCI bus 680. PCI to PCI bus bridge 810 is connected to PCI bus 680 by PCI connection 820. This connection contains the same data, address and control lines as does PCI connection 790 and PCI connection 770 which attach Fast Device B 700 and Fast Device A 690 to PCI bus 680. Also, PCI to PCI bus bridge 810 is connected to 66 MHz clock input 800. 66 MHz clock input 800 originates at the same source, 66 MHz clock source 602, as does the clock source for Fast Device A 690 and Fast Device B 700.

In a similar manner, PCI to PCI bus bridge 810 is connected to PCI bus 860. PCI to PCI bus bridge 810 has a PCI connection 830 and a 33 MHz clock input 840. As it sees the same clock inputs and has the same connections to both PCI buses, PCI to PCI bus bridge 810 is able to read and write to both PCI bus 680 and PCI bus 860. The internal circuity of PCI to PCI bus Bridge 810 is then able to transmit data to and from both PCI buses even though both PCI buses run at different clock rates. This presents the advantage of allowing Fast Device A 690 and Fast Device B 700 to run at a faster clock rate than the Slow Device C 606 and Slow Device D 940. These devices are allowed to run at a slower clock rate.

However, this prior art solution as depicted in data processing system 600 poses many difficulties and expenses. First, there is the expense of maintaining two separate PCI bus structures. This implies that separate data paths must be formed and maintained on the circuit board to allow the signals for each bus to be communicated. Also, there is the need for two separate arbiters. Most importantly, however, data moving from one PCI bus to the other must pass through PCI to PCI bus bridge 810. Such a data transfer that has to go through PCI to PCI bus bridge 810 means that data will be slowed down when being transferred from one PCI bus to the other due to the inherent latencies in PCI to PCI bus bridge 810. Finally, there is the added cost of PCI to PCI bus bridge 810 itself.

Figure 5:
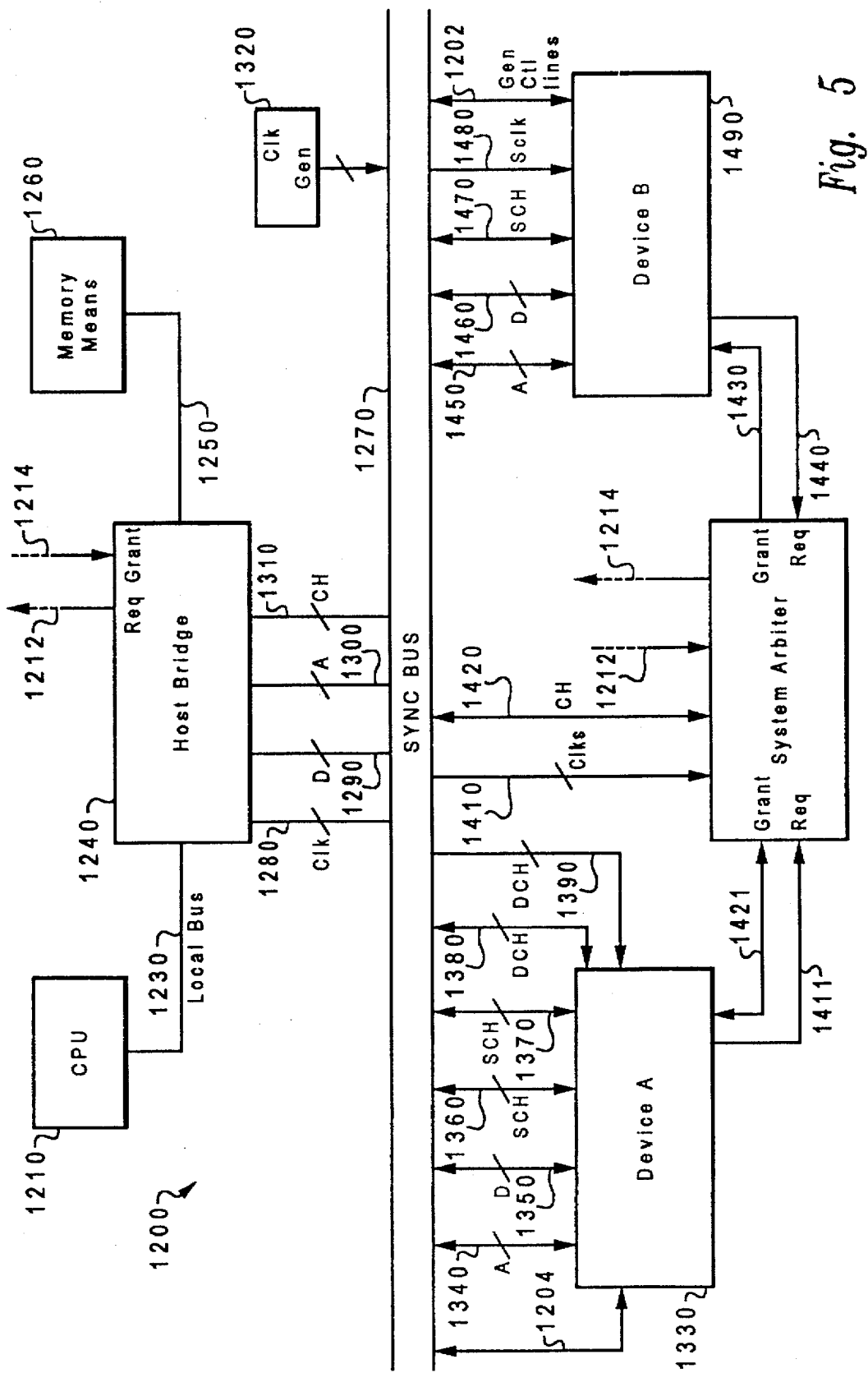
FIG. 5 illustrates a data processing system with an implementation of the present invention.

FIG. 5 shows a generic implementation of the present invention. FIG. 5 contains improved data processing system 1200. Improved data processing system 1200 is comprised of CPU 1210. Although only CPU 1210 is shown, such a system could have many central processing units. CPU 1210 is attached to local bus 1230. Local bus 1230 is attached to host bridge 1240. Host bridge 1240 is connected to memory means 1260 by memory bus 1250.

Although CPU 1210, host bridge 1240 and memory means 1260 appear in the same positions as the corresponding devices shown in FIG. 3 and FIG. 4, this particular arrangement is not necessary to the present invention. A person skilled in the art will appreciate that there are many way to configure a CPU and memory means and attach them to synchronous bus 1270. These may or may not include a host bridge as depicted by host bridge 1240. Further, local bus 1230 and memory bus 1250 are not necessary for the present invention. They are simply shown here as one possible implementation of the present invention.

Host bridge 1240 is connected to synchronous bus 1270 by a plurality of connections. First there is clock input 1280. Clock input 1280 is comprised of one or more signals emanating from clock generator 1320. The number of clock signals in clock input 1280 will depend on how many different speeds of communication host bridge 1240 will support with respect to synchronous bus 1270. For example, if host bridge 1240 is able to communicate with synchronous bus 1270 at two different speeds, host bridge 1240 will have at least two different clock sources as inputs. Therefore, the number of clock signals contained in clock input 1280 will depend on how many modes or speeds that host bridge 1240 is capable of supporting.

Next, there are data lines 1290 and address lines 1300. Data lines 1290 provide a communications path between host bridge 1240 and synchronous bus 1270 to allow data to pass to and from. Likewise, address lines 1300 allow host bridge 1240 and synchronous bus 1270 to communicate address information. Although these lines are shown as separate and distinct in this particular implementation of an improved data processing system, these lines may be multiplexed, thus allowing only one true set of connections as is found in the PCI specifications. Further, these lines serve only to communicate data and address information. Therefore, any method or means of communicating this information from synchronous bus 1270 to host bridge 1240 is within the scope of this invention. One possible method of communicating this information is by an optical means.

Also connecting synchronous bus 1270 and host bridge 1240 are control lines 1310. Control lines 1310 are comprised of two different types of control lines. The first type of control lines included in control lines 1310 is generic control lines. Generic control lines are generic to synchronous bus 1270 and function the same at any speed at which data is being transferred on synchronous bus 1270. Every device attached to synchronous bus 1270 is connected to these generic control lines.

Included in these generic control lines are lines that manage the sending and receiving of information over a synchronous bus. To be generic, these lines must function at any clock speed the bus is being run. Thus, for a bus like the one shown in FIG. 5 which runs at more than one clock speed, these generic clock lines need not be repeated or duplicated for each different speed the bus is capable of running, since their functionality is maintained at any speed.

The second type of control lines contained in control lines 1310 are clock speed specific control lines. These clock speed specific control lines are specific to a given clock speed at which host bridge 1240 can communicate data. In general, such lines that are specific for a given clock speed will need to be duplicated for each clock speed a device is capable of communicating data. Thus, if a given device can communicate data at rates as defined by three different clock speeds, the control lines that are clock speed specific may need to be duplicated three times. Note that each device attached to a multi-speed synchronous bus need not be connected to each set of clock speed specific control lines. The device only needs to be attached to those lines that control the communication of information at speeds at which the device may wish to communicate.

Exactly how many of the control lines of a given synchronous bus will be clock speed specific will depend on the particular implementation of the bus. In general, the clock speed specific control signals will be the signals that are necessary to create an IDLE state on the bus. The IDLE state on a bus is the minimum logical state, using the minimum number of signals, whereby when this state occurs, devices attached to the bus understand that no cycles are currently being run on the bus. These clock speed specific control lines are duplicated so that a fast device may broadcast an IDLE state to a slow device while the fast device is utilizing a clock source unavailable to the slow device to communicate data over the synchronous bus. By having a fast device broadcast an IDLE state to the slow devices while it is communicating fast cycles over the synchronous bus, slow devices are prevented from interfering with the fast device's communications. Having a fast device broadcast IDLE also prevents slow devices from transitioning into an unknown state. These erroneous transitions might otherwise occur as the slow devices will probably be unable to accurately follow the fast cycles being communicated by the fast device.

Also attached to synchronous bus 1270 is Slow Device B 1490. Slow Device B 1490 is connected to synchronous bus 1270 by address lines 1450 and data lines 1460. As noted above, address lines 1450 and data lines 1460 may be separate physical connections or they can be the same physical connection if they are multiplexed as is done in PCI systems.

Also connecting Slow Device B 1490 to synchronous bus 1270 are generic control lines 1202. Generic control lines 1202 carry the same signals as do the generic control lines contained in control lines 1310 and they maintain their functionality at any clock rate at which data is being communicated over synchronous bus 1270.

Slow Device B 1490 is further connected to synchronous bus 1270 by shared clock speed specific control lines 1470 and shared clock inputs 1480. Shared clock speed specific control lines 1470 are referred to as "shared" because Fast Device A 1330 is connected to these same control lines. Thus, the two devices share these control lines. In a similar manner, shared clock inputs 1480 are composed of at least one clock signal from clock generator 1320, that is also common to Fast Device A 1330.

In summary, Slow Device B 1490 is connected to synchronous bus 1270 by means of a plurality of lines. These lines include: address lines 1450, data lines 1460, shared clock speed specific control lines 1470, shared clock inputs 1480 and generic control lines 1202. Generic control lines 1202 are lines that are not clock speed specific and are attached to other devices attached to synchronous bus 1270. Shared control lines 1470 are control lines that are shared with other devices attached to synchronous bus 1270. Shared control lines 1470 are clock speed specific in that each group of these clock speed specific control lines are specific to a given clock speed at which Slow Device B 1490 can communicate data.

Also connected to synchronous bus 1270 is Fast Device A 1330. Fast Device A 1330 is connected to synchronous bus 1270 by a plurality of lines. These lines include generic control lines 1204, address lines 1340, data lines 1350, shared clock speed specific control lines 1360, shared clock inputs 1370, unique clock speed specific control lines 1380 and unique clock inputs 1390. Address lines 1340 and data lines 1350 communicate address and data information to and from Fast Device A 1330 via synchronous bus 1270. Generic control lines 1204 represent control lines that are not clock speed specific. These lines are similar to control found in Slow Device B 1490. Shared control lines 1360 and shared clock lines 1370 are control and clock lines that are shared with at least one other device attached to synchronous bus 1270. In this particular example, these lines would be shared with either host bridge 1240 or Slow Device B 1490 or possibly both of these devices. These shared clock and control lines may be shared with devices not shown in this particular drawing that are also attached to synchronous bus 1270.

Fast Device A also contains unique clock speed specific control lines 1380 and unique clock inputs 1390. These control and clock lines are unique with respect to Slow Device B 1490. However, they are shared with at least one other fast type device attached synchronous bus 1270. This fast device might be host bridge 1240 or it could be some other device not shown in this drawing attached to synchronous bus 1270. Like shared clock speed specific control lines 1360, unique control lines 1380 are clock speed specific. Also, like shared clock speed specific control lines, unique control lines 1380 will have a set of control lines for every clock input that is unique to the device.

Fast Device A 1330 uses unique control lines 1380 and unique clock inputs 1390 to transfer data over synchronous bus 1270 at speeds that are not available to Slow Device B 1490. Thus, having Fast Device 1330 being attached to clock signals that are faster than the clock signals going to Slow Device B 1490 allows Fast Device A 1330 to transfer data over synchronous bus 1270 at a faster rate. However, Fast Device A's ability to transfer at this higher rate does not impeded or prevent Slow Device B 1490 from transferring data over synchronous bus 1270 at a slower rate. Also, since Fast Device A 1330 and Slow Device B 1490 are connected to shared clock speed specific control lines, they can communicate data between them at a clock rate that is associated with these control lines. Thus, Fast Device A 1330 and Slow Device B 1490 can coexist on the same synchronous bus yet transfer data at various rates of speed.

Fast device A 1330, host bridge 1240 and Slow Device B 1490 are attached to system arbiter 1400. These devices are attached to system arbiter 1400 by a plurality of REQUEST and GRANT lines. Although FIG. 5 shows these REQUEST and GRANT lines as separate entities, they need not be. System arbiter 1400 simply has to have a way to know when a device attached to the synchronous bus wishes to access synchronous bus 1270 and system arbiter 1400 has to have a means to tell a device when he has access to synchronous bus 1270. System arbiter 1400 is also connected to clock inputs 1410 and control lines 1420. These connections may be optional in other implementations of an improved data processing system 1200. Further, the control and clock lines that system arbiter 1400 needs to see in any one implementation of an improved data processing device will vary.

Specifically, Fast Device A 1330 is attached to system arbiter 1400 by GRANT line 1421 and REQUEST line 1411.

Slow Device B 1490 is attached to GRANT line 1430 and REQUEST line 1440 which in turn attaches to system arbiter 1400. Finally, host bridge 1240 is attached to system arbiter 1400 by REQUEST line 1212 and GRANT line 1214.

System arbiter 1400 provides much the same functionality as system arbiters in the prior art. However, a system arbiter in improved data processing system 1200 may have to have more intelligence than a prior art system arbiter. This would be the case for instance, if Slow Device B 1490 regulated its access to synchronous bus 1210 by examining its control lines. As shown in FIG. 5, Slow Device B 1490 does not have access to unique control lines 1380 or unique clocks 1390. Thus, if Slow Device B 1490 needed to see these various control lines that it did not have access to in order to determine if there was activity occurring on synchronous bus 1210, the situation may arise where Slow Device B 1490 would try to access synchronous bus 1270, when in actuality, Fast Device A 1330 was transmitting data. In such a situation, system arbiter 1400 would have to have the intelligence to know when Fast Device A 1330 was transferring data and it would have to know that it cannot grant access to synchronous bus 1270 to Slow Device B 1490 when such a transaction was taking place.

Figure 6:
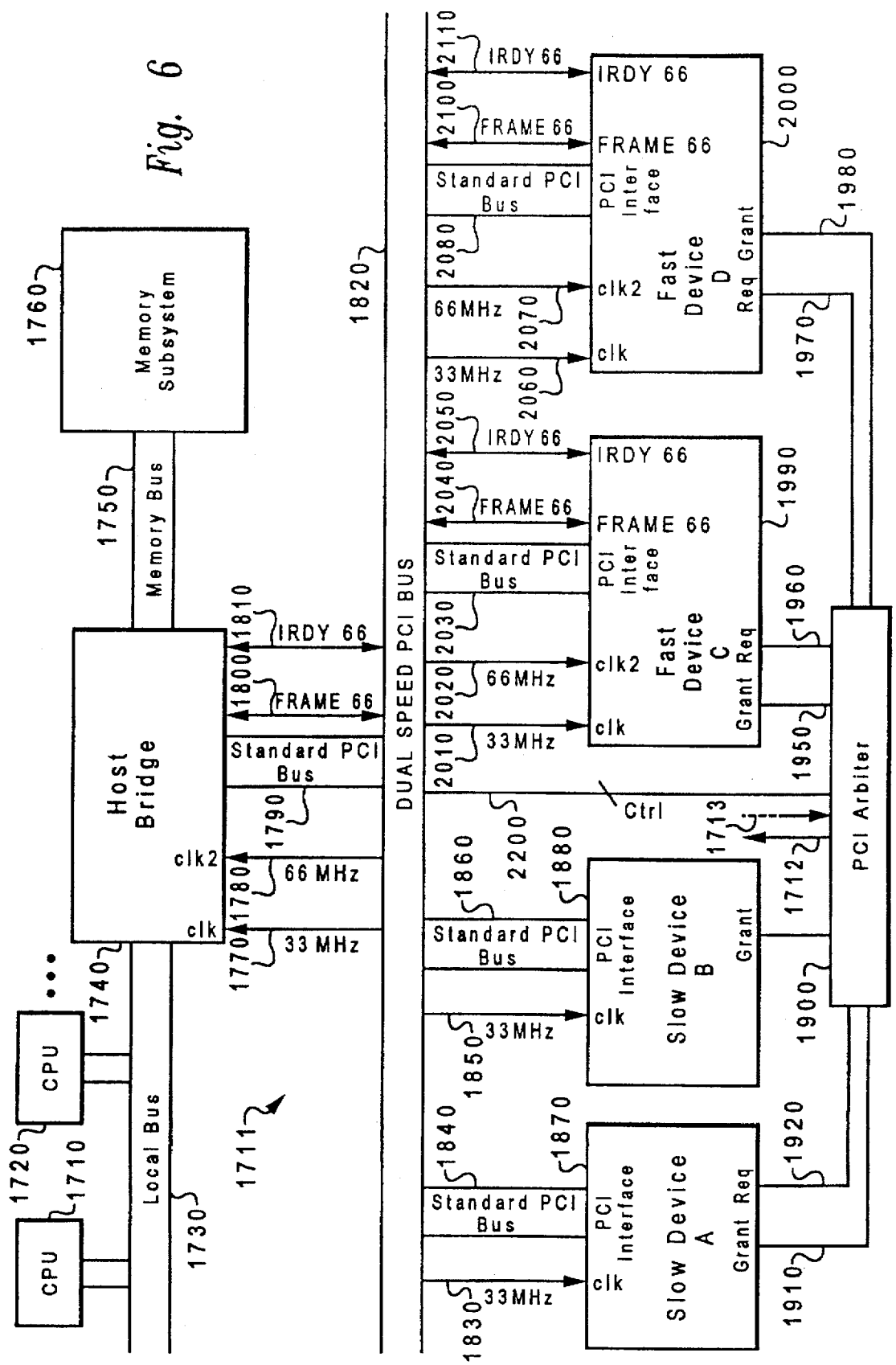
FIG. 6 depicts a data processing system containing a dual speed PCI synchronous data bus that has been modified to include the present invention.

Now with respect to FIG. 6, FIG. 6 shows a PCI implementation of the present invention. FIG. 6 is comprised of improved data processing system 1711. Improved data processing system 1711 contains CPU A 1710 and CPU B 1720. As mentioned before, although two CPUs are shown in this particular implementation of the present invention, there could only be one CPU or there could be many CPUs, as the number is not critical. CPU A 1710 and CPU B 1720 are connected to local bus 1730. Local bus 1730 is in turn connected to host bridge 1740. Also attached to host bridge 1740 is memory bus 1750 which in turn is attached to memory subsystem 1760.

Host bridge 1740 is attached to dual speed PCI bus 1820. One set of connections connecting host bridge 1740 to dual speed PCI bus 1820 is PCI connection 1790. Included in standard PCI connection 1790 are standard address and data lines as well as the standard control lines. In addition, host bridge 1740 receives as inputs 33 MHz clock input 1770 and 66 MHz clock input 1780.

Host bridge 1740 is also connected to dual speed PCI bus 1820 by FRAME_66 line 1800 and IRDY_66 line 1810. FRAME_66 line 1800 and IRDY_66 line 1810, in combination with 66 MHz clock input 1780, allow host bridge 1740 to communicate over dual speed PCI bus 1820 at 66 MHz in addition to the normal 33 MHz.

Also attached to dual speed PCI bus 1820 are a plurality of devices. Slow Device A 1870 and Slow Device B 1880 are connected to dual speed PCI bus 1820 by means of a standard PCI bus interface. Slow Device A 1870 is connected to dual speed PCI bus 1820 by standard PCI connection 1840, and Slow Device B is connected by PCI connection 1860. These standard PCI bus interfaces are the same as the interface to host bridge 1740. That is, they provide the standard PCI bus address, data, and control lines found on all conventional PCI bus interfaces.

In comparison with Slow Device B 1490 shown in FIG. 5, the standard PCI connection 1840 shown in FIG. 6 will contain address lines 1450, data lines 1460, shared control lines 1470 and generic control lines 1202. These are the lines that connect Slow Device B 1490 to synchronous bus 1270 in FIG. 5. Also connecting Slow Device A 1870 to dual speed PCI bus 1820 is 33 MHz clock input 1830. Thus, since Slow Device A 1870 only has one clock input, Slow Device A 1870 can only transfer data over dual speed PCI bus 1820 at 33 MHz.

Slow Device B 1880 is very similar to Slow Device A 1870. Slow Device B 1880 has the same standard PCI bus interface 1860 and same 33 MHz clock input 1850.

Also attached to dual speed PCI bus 1820 are Fast Device C 1990 and Fast Device D 2000. Both of these devices are attached to dual speed PCI bus 1820 by the same clock and standard PCI bus interface as found in Slow Device A 1870 and Slow Device B 1880. In addition to the standard clock and PCI bus connections, Fast Device C 1990 has 66 MHz clock input 2020, FRAME__66 line 2040 and IRDY__66 line 2050 as connections to dual speed PCI bus 1820.

Fast device D 2000 is configured in an identical manner as Fast Device C 1990. Fast device D 2000 has the same standard PCI bus connections as does Slow Device A 1870, Slow Device B 1880 and Fast Device C 1990. These are 33 MHz clock input 2060 and standard PCI connection 2080. In addition to these connections, Fast Device D 2000 is connected to dual speed PCI bus 1820 by FRAME__66 line 2100, IRDY__66 line 2110 and 66 MHz clock input 2070. The additional control lines found on Fast Device C 1990 and Fast Device D 2000 allow these two devices to communicate over dual speed PCI bus 1820 at 33 MHz as well as 66 MHz.

Host bridge 1740 and all slow and fast devices attached to dual speed PCI bus 1820 are connected to PCI arbiter 1900 by means of GRANT and REQUEST lines. These GRANT and REQUEST lines serve the same purpose in this specific implementation of the present invention as the more general implementation shown in FIG. 5. These line allow PCI arbiter 1900 to know when a device or host bridge requires access to dual speed PCI bus 1820 and allows PCI arbiter a means by which it can communicate to these devices or host bridge that they are now allowed to communicate over dual speed PCI bus 1820.

Fast device C 1990 can communicate synchronously at a rate of 66 MHz with Fast Device D 2000 or host bridge 1740. This communication occurs in the following manner:

If Fast Device C 1990 is the device wishing to initiate communication with Fast Device D 2000, Fast Device C 1990 must first gain access to dual speed PCI bus 1820. Fast device C 1990 gains permission to communicate over dual speed PCI bus 1820 by way of PCI arbiter 1900. First, Fast Device C activates his REQUEST line 1960. This REQUEST line connects Fast Device C 1990 to PCI arbiter 1900. PCI arbiter 1900 will see Fast Device C 1990's REQUEST line being activated and will then take steps to determine whether and when Fast Device C 1990 can gain access to dual speed PCI bus 1820. Using any one of a number of arbitration schemes, PCI arbiter 1900 will at some point activate Fast Device C 1990's GRANT line 1950. Upon seeing its GRANT line activated, Fast Device C 1990 can then take steps to access dual speed PCI bus 1820. Once Fast Device C 1990 has gained access to dual speed PCI bus 1820, will be able to communicate with Fast Device D 2000 at 66 MHz. Fast Device C 1990 will use his FRAME__66 line 2040 and IRDY__66 line 2050 to initiate communications with Fast Device D 2000, in a manner very similar to that of a normal PCI device to PCI device communication. The only difference will be that instead of using the normal FRAME and IRDY lines, Fast Device C 1990 will be using the new FRAME__66 and new IRDY__66 control lines as well as the new 66 MHz clock to communicate data to the other fast device. While these communications are taking place, Fast Device C 1990 will communicate to Slow Device A 1870, Slow Device B 1880, and any other slow devices attached to dual speed PCI bus 1820 over their FRAME and IRDY lines an IDLE state. This IDLE state is communicated to these slow devices in order to trick them into thinking than no cycles are being run on the bus. This both prevents the slow devices from interfering with the fast devices+ communication session and allows the slow devices to function normally and monitor their IRDY and FRAME lines for the start of a 33 MHz cycle. Since the FRAME and IRDY lines are the only ones that devices attached to a PCI bus use to detect an IDLE state, these are the only clock speed specific control lines that must be duplicated in order to support another bus speed.

In general, the various fast and slow devices as well as PCI arbiter 1900 act in accordance with the PCI specification in order to determine who can access dual speed PCI bus 1820 and when they may do so. However, there is one situation in which PCI arbiter 1900 cannot act in accordance with the prior art PCI specification. This situation arises when access to dual speed PCI bus 1820 is shifted from a fast device to a slow device. If PCI arbiter 1900 acted in accordance with the current PCI specifications in this situation, there would exist the possibility for two devices trying to access the bus at the same time.

This situation would occur because the current PCI specification allows for hidden arbitration. Hidden arbitration occurs when a first device's GRANT line is deactivated and a second device's GRANT lines is activated while the first device is still communicating over the PCI bus. In that situation the second device must recognize that the first device is still in the process of finishing his communication over the PCI bus and must wait for this communication to end before beginning his communications on the PCI bus. The second device determines that the first device has finished his communications by monitoring the FRAME and IRDY lines. The second device monitors these lines and looks for the occurrence of an IDLE state. When a device's GRANT line is activated, and the IRDY and FRAME lines are in an IDLE condition, that device will then have access to the PCI bus.

Using this type of algorithm, improved data processing system 1711 would encounter problems when PCI arbiter 1900 D deactivated a fast device's GRANT line and asserted a slow device's GRANT line while the fast device is still communicating data over the dual speed PCI bus. The problem occurs because the slow device does not have access to the fast device's FRAME__66 and IRDY__66 control lines, and thus cannot determine whether the fast device is still communicating data over the dual speed PCI bus or not. The slow device only has access to the slow FRAME and IRDY lines from the standard PCI bus interface. These lines will be in an IDLE state because whenever a fast device is communicating at 66 MHz on the dual speed PCI bus, the fast device is required to assert an IDLE state over the slow FRAME and IRDY lines.

Due to this problem, the PCI arbiter must embody some enhanced functionality over a normal PCI arbiter. This new functionality will effect the situation when the PCI arbiter is deasserting a fast device's GRANT line and asserting a slow devices GRANT line. In this situation, the PCI arbiter will be required to delay asserting the slow device's GRANT line until the arbiter, and not the slow device, has determined that the fast device has finished communicating over the dual speed PCI bus. When the arbiter has determined that the fast device has ended its communications over the bus, he may then assert the slow device's GRANT line. In summary, PCI arbiter 1900 will be limited in the amount of hidden arbitration he may perform when giving bus access from a fast device to a slow device.

In all other respects, the PCI arbiter will perform as the PCI arbiters of the standard PCI systems.

Both Fast Device C 1990 and Fast Device D 2000 have the ability to communicate at 66 MHz as well as the ability to communicate at 33 MHz. What speed each of these fast devices will communicate is determined by a bit that enables the higher speed operation. In addition to this bit that enables the higher speed operation, both of these fast devices contain a bit in their configuration that indicates their ability to communicate at a higher speed. If a software device driver of a certain fast device detect that all the targets that will potentially receive cycles from that fast device as an initiator can operate at the higher frequency, then the higher speed mode of operation can be enabled on that device. The set of potential targets for any one initiator is a subset of all the devices on the bus and is quite often only one device, most likely the host bridge (which provides bus master access to system memory) or a dedicated companion card. In the preferred embodiment, upon reset, all fast devices would revert to a slow communication mode of operation in order to maintain maximum compatibility with existing slow devices.

Although bits are used in the preferred embodiment of this invention, any other enablement means and indicating means is within the scope of this invention. For example, one could read a register, a voltage level, or even a resistance in order to determine if a device was capable of communicating a higher speed. Likewise, one could set a register, close a relay, or even set a DIP switch in order to enable a device to communicate at high speeds.

Several different algorithms can be developed to determine at which speed host bridges can communicate with the devices attached to the bus. Host bridges are unique in that they talk to many different devices on the bus. Due to this fact, several different methods of communicating with devices on the bus can be developed. For example, one could set up a range of addresses that generate high speed cycles while other addresses generate low speed cycles. Another example would be that the host bridge acts as a fast device only when it was target of a communication from another fast device.

Although having a host bridge act like a fast device would enhance communications between a fast device residing on a dual speed PCI bus and the CPU(s) and system memory, an improved data system such as that shown in FIG. 6 does not to have a host bridge to be able to communicate at high speeds. As long as the PCI arbiter has been upgraded to allow for fast device communication, various fast devices on the PCI bus can communicate at higher speeds between themselves. This type of communication would not involve the host bridge.

The above described methods of enabling a multi-speed device to communicate at a higher speed are only a few of the many ways to accomplish this task. Other methods of determining what speed a device can communicate with another device include dedicated lines for this purpose, as well as firmware that determines the speed.

Figure 7:
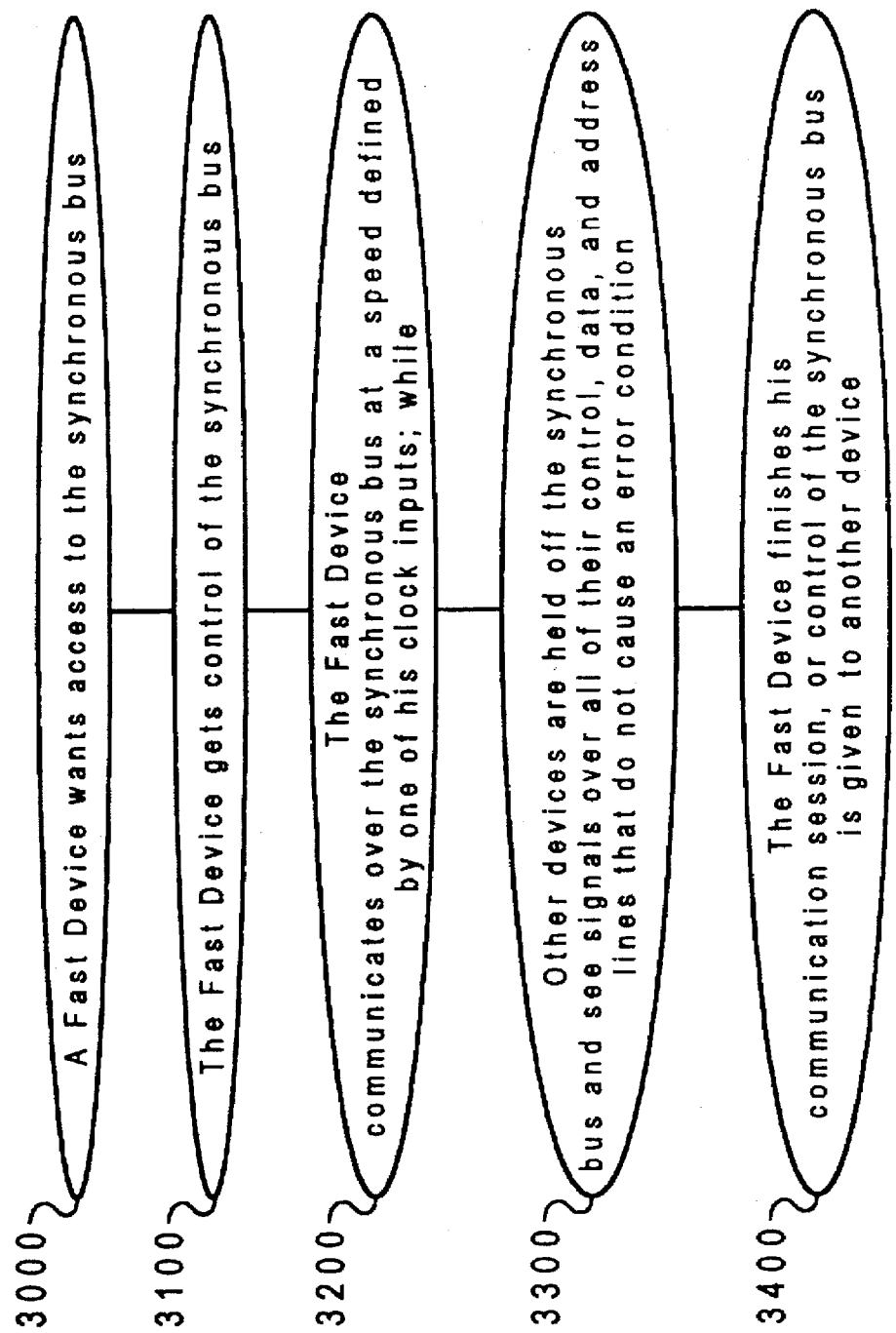
FIG. 7 illustrates the steps that an implementation of the current invention performs in communicating data over a multi speed synchronous data bus.

Now with respect to FIG. 7. FIG. 7 describes the steps that an improved data processing system would take in implementing the present invention. This example assumes that the Fast Device has more than one clock input and can transfer data over the synchronous bus at more than one speed. It is also assumed that there are other devices attached to the same synchronous bus that cannot transfer data at all speeds that the Fast Device can.

Initially in step 3000, the Fast Device existing on a multi-speed synchronous bus determines that it needs to communicate data over this synchronous bus. This determination can be caused by many different factors. For instance, the device may have received data from an external data source and this data needs to be communicated to the central processing unit's main memory. Or the Fast Device could determine that it needs some data located in the main memory and requires this data be communicated to it over the synchronous bus. In yet another example, a fast device may determine that it needs to communicate with another fast device residing on the synchronous bus.

In step 3100, the Fast Device gains control of the synchronous bus. Gaining control of the synchronous bus can be implemented in a number of ways. As was shown in FIGS. 3, 4, 5, and 6, a system arbiter can be used to determine which devices attached to the synchronous bus can access the bus at any one time. However, the use of any arbiter is simply one way to determine which individual device residing on the synchronous bus can gain access to the bus. Another example of how a device attached to the synchronous can gain access is that the devices residing on the bus can figure out between themselves who has access to the bus at any one time. All that is important is that a device can gain access to the bus and that other devices residing on the bus recognize when a given device has gained control of the bus and do not attempt to access the bus themselves. This would result in several devices trying to communicate over the bus at once rendering the synchronous bus unusable.

In step 3200, the Fast Device has gained control of the bus and is now communicating over the synchronous bus at a speed determined by one of his clock inputs.

The exact method in which the Fast Device communicates data over the synchronous bus can vary between the different synchronous bus standards. As was discussed in the previous figures, one type of synchronous bus is the PCI bus. The PCI bus has explicit standards on how devices communicate data over the PCI bus. However, there are many other synchronous bus types and this invention is applicable to any synchronous bus, or any device that employs a synchronous bus type process.

In step 3300, the Fast Device is assumed to be communicating over the synchronous bus. While communicating over the synchronous bus, other devices must held off the bus so that they do not interfere with the fast devices communication. As was discussed in step 3100, other devices may be held off by means of a system arbiter. In addition to being held off the synchronous bus, the signals being transmitted over the synchronous bus via the address, data and control lines might cause the other devices enter into an error condition. For example, when the Fast Device is communicating data over the synchronous bus at a fast rate of speed, these communications have to be done in a manner which does not cause a slow device to enter into an error state because of the signals being transmitted over the bus. That is, the signals the Fast Device is using to communicate over the synchronous bus may very well be unintelligible to the slower devices residing on the bus. These unintelligible signals must not cause the slow device to try and perform some action on the bus that interferes with the Fast Device's communications over the bus. These signals also must not drive the slow device into a state that interferes with its ability to function normally once the current communication is over.

As was discussed in FIG. 5, these goals may be accomplished by having a fast device use unique control lines which are not available to the slow device to control the communication of data over the synchronous bus without causing the slow device to enter into an error condition. The use of its unique control lines also allows the fast device to assert signals over shared clock speed specific control lines that trick the slow device into thinking that no transactions are being performed on the synchronous data bus, while in actuality, the fast device is communicating data over the synchronous data bus.

Finally, in step 3400, the Fast Device will either finish its transfer, or the bus may be taken away from him by a device such as an arbiter.

Figure 8:
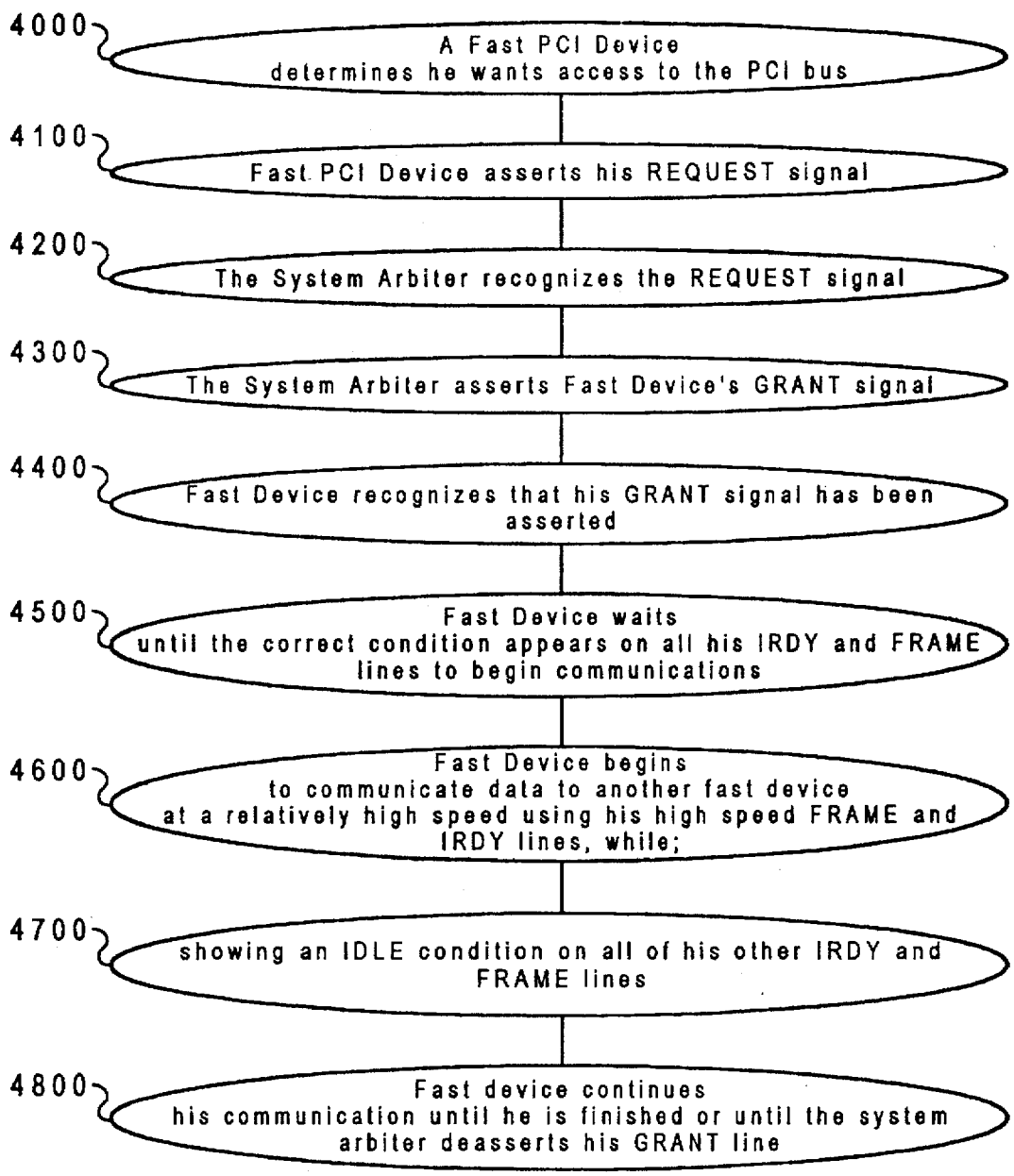
FIG. 8 illustrates the steps that a PCI implementation of the current invention performs in communicating data over a dual speed synchronous bus.

FIG. 8 describes the method by which a fast device existing in a improved data processing system such as the one shown in FIG. 6 will communicate over the Dual Speed PCI Bus to another fast device. In step 4000, the Fast PCI Device determines that he needs access to the Dual Speed PCI Bus. This determination may be in response to receiving data from an outside source and determining the need to pass this data to main system memory or it may be in response to the Fast PCI Device's determination that it needs to communicate to another Fast PCI Device on the Dual Speed PCI Bus.

In step 4100, when the Fast PCI Device determines he needs access to the Dual Speed PCI Bus, he will assert his REQUEST line. This will let the system arbiter know that the Fast PCI Device requests access to the system bus.

In step 4200, the system arbiter will see the fast device assert his REQUEST line. The system arbiter will then take steps to grant the Fast PCI Device access to the Dual Speed PCI Bus, In step 4300, at some point the system arbiter will determine that the Fast PCI Device can access the Dual Speed PCI Bus. He will then communicate this information to the Fast PCI Device by asserting the Fast PCI Device's GRANT line.

In step 4400, the Fast PCI Device will determine that the system arbiter has granted him access to the Dual Speed PCI Bus when he sees his GRANT line being asserted.

Then in step 4500 the Fast PCI Device will wait until the correct conditions appear on all his IRDY and FRAME lines to begin communications. These include both the slow, standard IRDY and FRAME lines and the fast IRDY__66 and FRAME__66 lines. The exact conditions and circumstances by which a device can access the PCI bus after their GRANT line has been asserted are defined in the PCI Specification. Under most circumstances this condition will occur when an IDLE condition appears on the IRDY and FRAME line.

In step 4600, the Fast PCI Device begins to communicate data to another fast device over the Dual Speed PCI Bus. This communication will take place at a relatively higher speed. This higher speed is shown to be 66 MHz in the Dual Speed PCI Bus of FIG. 6.

While the Fast PCI Device is communicating over the Dual Speed PCI Bus at a relatively high data rate, in step 4700, this same fast device will communicate to all of the other slow devices attached to this same Dual Speed PCI Bus an IDLE condition over the slow IRDY and FRAME lines. This IDLE condition is communicated to the slow devices for two reasons. First, broadcasting IDLE will keep the slow devices from transitioning to an unknown state. Second, upon seeing IDLE, the slow PCI devices will not interfere with the fast transactions currently occurring over the Dual Speed PCI Bus.

In step 4800, the Fast PCI Device will continue his communications over the Dual Speed PCI Bus until either it finishes his communication or until the system arbiter deasserts his GRANT line. In this case, as defined in the PCI specification, the Fast PCI Device will be able to finish his current transaction before ceasing transmissions or receptions over the Dual Speed PCI Bus.

It must be noted that if the system arbiter takes control of the bus away from a fast device which is still communicating at a relatively high speed and gives control of the Dual Speed PCI Bus to a slow device which is unable to operate at this relatively high speed, certain precautions need to be taken. Namely, the system arbiter must wait until the fast device finishes with his current transaction before deasserting its GRANT line. In other words, the system arbiter cannot perform hidden arbitration when taking control of the Dual Speed PCI Bus away from a fast device which is communicating at a fast data rate and giving control of the Dual Speed PCI Bus to a slow device.

This is because the slow device has been seeing an IDLE condition over his FRAME and IRDY lines and will attempt to begin communications over the Dual Speed PCI Bus as soon as his GRANT line is asserted. This would cause an error condition to occur occasionally because the Fast PCI Device can still be finishing his current transaction when his GRANT line is deasserted and the GRANT line of a slower device is asserted.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An improved data processing system comprising:
   a synchronous data bus for communicating data;
   at least one central processing unit for executing program instructions, said at least one central processing unit being communicably connected to said synchronous data bus;
   a memory means for storing at least one of programming instruction and digital data, said memory means being communicably connected to said at least one central processing unit;
   at least two data processing devices being communicably connected to said synchronous data bus; said at least two data processing devices including:
   a fast data processing device and slow data processing device, said fast data processing device being capable of synchronously communicating data at a faster rate than said slow data processing device;
   said improved data processing system being operable in a plurality of modes of operation including a high-speed mode, wherein
   said fast data processing device includes means for synchronously communicating data over said synchronous data bus at a relatively high rate of speed in said high speed mode; and
   said slow data processing device includes means for preventing interference with said fast data processing device and for preventing said slow data processing device from transitioning into an incorrect logic state.

2. An improved data processing system as recited in claim 1 further comprising:
a data bus arbiter which restricts said slow data processing device from accessing said synchronous data bus while said fast data processing device communicates data over said synchronous data bus.

3. An improved data processing system comprising:
a synchronous data bus for communicating data;
at least one central processing unit for executing program instructions, said at least one central processing unit being communicably connected to said synchronous data bus;
a memory means for storing at least one of programming instruction and digital data, said memory means being communicably connected to said at least one central processing unit;
a plurality of clock signal generator systems operating at different speeds;
at least one data processing device being communicably connected to said synchronous data bus, said at least one data processing device minimally having:
an address signal group for communicating address information via said synchronous data bus;
a data signal group for communicating data information via said synchronous data bus;
a generic control signal group;
at least one clock input for determining the rate at which address and data information is communicated via said synchronous data bus, said at least one clock input being communicably connected to said plurality of clock signal generator systems; and, for each and every said at least one clock input,
at least one clock speed specific control signal group for managing communications occurring on said address signal group and said data signal group, said communications occurring at a selected data rate defined by said at least one clock inputs;
said at least one data processing device including a selected data processing device additionally having:
a plurality of clock inputs for determining the rate at which address and data information is communicated via said synchronous data bus, said plurality of clock inputs being communicably connected to said plurality of clock signal generator systems; and, for each and every said plurality of clock inputs,
a plurality of clock speed specific control signal groups for managing communications occurring, at a selected data rate defined by said plurality of clock inputs, by said address signal group and said data signal group.

4. An improved data processing system as recited in claim 3 further comprising:
a second data processing device;
said selected data processing device having:
at least one unique clock speed specific control signal group and at least one unique clock input; said at least one unique clock speed specific control signal group and said at least one unique clock input being unique to said selected data processing device with respect to said second data processing device; and
at least one shared clock speed specific control signal group and at least one shared clock input whereby both said selected data processing device and said second data processing device are communicably connected to said at least one shared clock speed specific control signal group and said at least one shared clock input;
said improved data processing system being operable in a plurality of modes of operation including a high speed mode wherein:
said selected data processing device gains access to said synchronous data bus;
said selected data processing device communicates address and data information via said synchronous data bus at a speed defined by a selected said at least one unique clock input and using a corresponding said at least one unique clock speed specific control signal group to manage said address and data information being communicated by said selected data processing device via said synchronous data bus; while
said second device does not access said synchronous data bus while said selected device has access.

5. An improved data processing system as recited in claim 4 wherein said selected data processing device contains:
an enablement means that enables said selected data processing device to communicate at different speeds as defined by said plurality of clock inputs; and
an indicating means that communicates at which speeds said selected data processing device may communicate.

6. An improved data processing system as recited in claim 4 further comprising:
a host bridge, said host bridge being communicably connected to said memory means and said synchronous data bus, said host bridge allowing said at least one data processing device to communicate with said memory means by at least two different speeds as defined by at least two said clock signal generator systems.

7. An improved data processing system as recited in claim 4 wherein:
said slow data processing device and said high speed data processing device can communicate over said synchronous data bus at a speed defined by said at least one shared clock input and using a corresponding said at least one shared clock speed specific control signal group in a manner consistent with the Peripheral Component Interconnect standard, Version 2.1.

8. An improved data processing system as recited in claim 7 further comprising:
a data bus arbiter for managing access to said synchronous data bus by said at least one data processing device, said data bus arbiter communicably connected to said synchronous data bus;
each and every said at least one data processing device having a REQUEST signal line and a GRANT signal line communicably connected to said data bus arbiter; and,
a means for activating said REQUEST signal line when access to said synchronous data bus is desired and a means for detecting the activation of said GRANT line to determine when access to said synchronous data bus has been granted.

9. An improved data processing system as recited in claim 8 wherein:
said data bus arbiter monitors said clock speed specific control signal groups belonging to every said at least one data processing device and is able to determine if a particular said at least one data processing device can access said synchronous data bus.

10. An improved data processing system as recited in claim 8 wherein:
said plurality of clock signal generator systems includes a slow clock signal generator and a fast clock signal generator;

said at least one clock speed specific control signal group of said selected data processing device includes:
  a FRAME signal and a IRDY signal, said FRAME signal and said IRDY signal being used to manage the communication of address and data information by said selected data processing device via said synchronous data bus, said address information and said data information being communicated at a speed defined by said slow clock signal generator;
  a FRAME_FAST signal and a IRDY_FAST signals; said FRAME_FAST signal and said IRDY_FAST signal being used to manage the communication of address and data information by said selected data processing device via said synchronous data bus, said address information and said data information being communicated at a speed defined by said fast clock signal generator.

11. An improved data processing system as recited in claim 9 wherein:
  said data bus arbiter determines if a particular said at least one data processing device can access said synchronous data bus by monitoring said clock speed specific control signal groups belonging to every said at least one data processing device for an IDLE state.

12. An improved data processing system as recited in claim 5 further comprising:
  a means for determining which of said at least one data processing devices are capable of communicating at a speed defined by a selected said at least one unique clock input;
  a means for determining which of selected said at least one data processing device said selected data processing device will potentially wish to communicate with; and
  a means for enabling said selected data processing device to communicate at a speed defined by a selected said at least one unique clock input.

13. An improved data processing system, comprising:
  a synchronous data bus for communicating data;
  at least one central processing unit for executing program instructions, said at least one central processing unit being communicably connected to said synchronous data bus;
  a memory means for storing at least one of programming instruction and digital data, said memory means being communicably connected to said at least one central processing unit;
  a plurality of clock signal generator systems operating at different speeds;
  at least one data processing device receptors capable of communicably coupling at least one data processing device to said synchronous data bus, said at least one data processing device minimally having:
    an address signal group for sending and receiving address information via said synchronous data bus;
    a data signal group for sending and receiving data information via said synchronous data bus;
    a generic control signal group;
    a plurality of clock inputs for determining the rate at which address and data information is communicated via said synchronous data bus, said plurality of clock inputs being communicably connected to said plurality of clock signal generator systems; and, for each and every said plurality of clock inputs,
  a plurality of clock speed specific control signal groups for managing communications occurring on said address signal group and said data signal group, said communications occurring at a selected data rate defined by said plurality of clock inputs.

14. An improved method of processing data, comprising:
  providing a synchronous data bus for communicating data;
  providing at least one central processing unit for executing program instructions, said at least one central processing unit being communicably connected to said synchronous data bus;
  providing a memory means for storing at least of one programming instruction and digital data, said memory means being communicably connected to said at least one central processing unit;
  providing a plurality of clock signal generator systems operating at different speeds;
  providing at least two data processing devices being communicably connected to said synchronous data bus, said at least two data processing devices minimally having:
    an address signal group for communicating address information via said synchronous data bus;
    a data signal group for communicating data information via said synchronous data bus;
    a generic control signal group;
    at least one clock input for determining the rate at which address and data information is communicated, said at least one clock input being communicably connected to said plurality of clock signal generator systems; and, for each and every said at least one clock inputs,
  at least one clock speed specific control signal group for managing address and data communications occurring at a selected data rate defined by said at least one clock inputs;
  said at least two data processing devices including a first data processing device and a second data processing devices;
  said first data processing device additionally having:
    at least one unique clock speed specific control signal group and at least one unique clock input; said at least one unique clock speed specific control signal group and said at least one unique clock input being unique to said first data processing device with respect to said second data processing device; and
    at least one shared clock speed specific control signal group and at least one shared clock input whereby both said first data processing device and said second data processing device are communicably connected to said at least one shared clock speed specific control signal group and said at least one shared clock input;
  utilizing said first data processing device for communicating address and data information via said synchronous data bus at a speed defined by a selected said at least one unique clock input and using a corresponding said at least one unique clock speed specific control signal group to manage said address and data information being communicated by said first data processing device via said synchronous data bus; while
  preventing said second data processing device from accessing said synchronous data bus while said first data processing device has access.

15. An improved method of processing data as recited in claim 14 further comprising:

providing a data bus arbiter for managing access to said synchronous data bus by said at least one data processing device, said data bus arbiter communicably connected to said synchronous data bus; and utilizing said data bus arbiter to prevent said second data processing device from accessing said synchronous data bus while said first data processing device has access.

16. An improved method of processing data as recited in claim 14 further comprising:

while utilizing said first device for communicating address and data information, utilizing said first data processing device for communicating an IDLE state over all said at least one shared clock speed specific control signal groups; and utilizing said second device for detecting an IDLE condition on all said at least one shared signal groups shared with said first device.

17. An improved method of processing data as recited in claim 14 further comprising:

providing a host bridge, said host bridge being communicably connected to said memory means and said synchronous data bus, said host bridge allowing said at least one data processing device to communicate with said memory means by at least two different speeds as defined by at least two said clock signal generator systems.

* * * * *